July 1, 1958
R. RICHOUX
2,841,029
FLEXIBLE REMOTE CONTROL CABLE
Filed Nov. 5, 1953
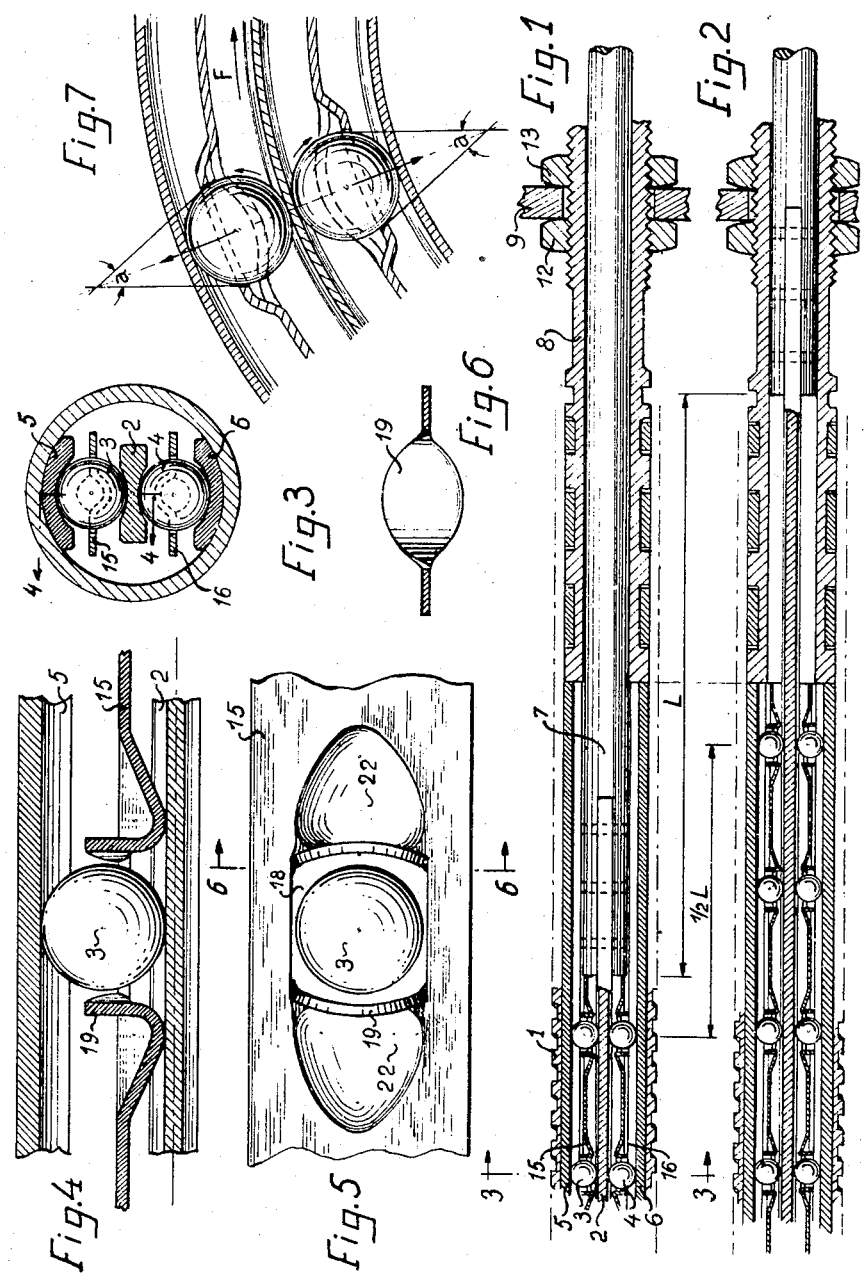
Inventor
Raymond Richoux
By Brown & Jeward
Attorneys

United States Patent Office 2,841,029
Patented July 1, 1958

2,841,029

FLEXIBLE REMOTE CONTROL CABLE

Raymond Richoux, Paris, France

Application November 5, 1953, Serial No. 390,374

Claims priority, application France August 11, 1953

5 Claims. (Cl. 74—501)

The present invention relates to flexible remote control cables of the type including a flexible tubular sheath housing a flexible core having a flat cross section, slidably mounted in said sheath between two rows of antifriction rolling members retained in cages constituted by two apertured flexible strips also slidably mounted in the sheath on either side of said flat core.

In a conventional device of this type, the rolling members, generally consisting of balls, are housed within openings of the cages, the size of said openings being slightly smaller than the diameter of the balls for the purpose of embedding and retaining the balls within the cages. This results, during operation of the device, in the balls having their periphery permanently in frictional engagement with the cages, a condition which opposes greatly the movement of the movable members inside the tubular sheath. Such frictional forces which already have a material value when the tubular sheath extends along a straight line, are liable to reach very high values when the tubular sheath is bent along a wavy path and especially when the bends in this path have a short radius of curvature.

In other flexible remote control cables belonging to the same general kind but in which the connecting element is not in the form of a flat core, the cages are constituted by a helical spring the convolutions of which hold the balls in place either directly or through the medium of elements connected to the spring. Assembling of such devices, however, is very intricate, especially when these devices are comparatively long.

An object of the invention is to provide a flexible control cable which has not the above mentioned drawbacks and which is very smooth in operation, whatever may be the path along which extends the tubular sheath. Such results are obtained by a particular design of the cages provided in the sheath for retaining the rolling members.

According to the invention, each of said cages is constituted by a flexible resilient strip having a flat cross-section and provided with openings in which said rolling members are housed, said openings being of a size slightly larger than the largest dimension of the rolling members and having walls sufficiently high for preventing the rolling members from escaping out of said openings.

The arrangement above stated confers on the cages a number of paramount qualities. First of all, it has the flexibility required to be bent along any curve. It is adapted to maintain the rolling members spaced at absolutely regular intervals, a condition which contributes in supplying the whole assembly with homogeneous and highly resistant structure. The cages are able to withstand heavy stresses, particularly thrust stresses at the end of each stroke. They offer a very weak resistance while they are being moved since the frictional forces between the rolling members and the cages are reduced to a minimum. Finally, these cages permit an easy and quick assembly of the whole device, whatever may be the length thereof.

According to a preferred embodiment of the invention, the wall of said openings is constituted by a turned-up edge of a dished portion of the cage adjacent the location of these openings.

According to another feature of the invention, the wall of the openings in the cage has such a shape as to be adapted to come into engagement with the adjacent antifriction element only on a portion of the same which is adjacent to its equator plane.

For a better and more complete understanding of the invention, reference may now be had to the following specification and to the accompanying drawings in which:

Fig. 1 is a longitudinal section of an embodiment of a flexible remote control cable according to the invention.

Fig. 2 is a view similar to Fig. 1 with the various parts shown in a different position, Fig. 3 is, on a larger scale, a cross-section along line 3—3 of Fig. 1, Fig. 4 shows, on a still larger scale, a section along line 4—4 of Fig. 3, Fig. 5 shows in top view a ball and the adjacent portion of the cage visible in Fig. 4, Fig. 6 is a section made on line 6—6 of Fig. 5 and Fig. 7 shows in longitudinal section, a portion of a similar device of a known type.

Referring first to Fig. 1, the general arrangement of the flexible remote control cable mainly consists, according to a known technique, of a flexible tubular sheath 1 which contains a flat core 2 also flexible and adapted to be moved to and fro with respect to the tubular sheath and arranged substantially along the axis of the tubular sheath between two rows of balls 3 and 4 adapted to be in rolling engagement with rollways 5 and 6 pressed against the inner wall of the tubular sheath 1 by the pressure exerted upon the balls, the inner diameter of the tubular sheath being substantially equal to the combined thickness of the flexible core 2 and of the two rollways 5 and 6 with the addition of the two diameters of the balls 3 and 4.

One end portion of the movable core 2 is secured to a control or operating rod 7 slidably mounted in a guiding sleeve 8 fitted in the end portion of the tubular sheath 1 and abutting endwise against the two rollways 5 and 6. The guiding sleeve 8 is secured for instance in a hole provided through a bulkhead 9, by means of two nuts 12 and 13 screwed on the threaded outer end portion of this guiding sleeve. The control rod 7 may be used for instance as an actuating or operating member to impart to the core 2 a tension or pressure to be transmitted, whereas the other end of the transmitting device is similarly designed and the corresponding rod serves as a member for receiving the forces thus transmitted.

The balls in each row of balls are maintained spaced from one another at regular intervals by means of cages 15 and 16 respectively having openings for nesting the balls, these cages being of a special structure which is the object of this invention.

Each cage is constituted by a strip of metal 15 (see particularly Figs. 4 and 5) having a flat cross-section substantially rectangular in shape and thick enough to withstand pressure and tension stresses and however sufficiently flexible to be bent in a direction perpendicular to its own plane and to be subjected to torsional stresses such as may occur when the transmitting assembly has to be bent along a more or less wavy path for connecting the control or transmitting station to the receiving station. Obviously, the cage 15, the flat core 2 and the two rollways 5 and 6, as well as the outer tubular sheath 1 itself, should be perfectly resilient to be restored to their original shape after having been subjected to a number of deformations resulting from the movement of the movable core 2 within the tubular sheath. Such resilient feature is particularly important for the flat core 2 and for the cages 15 and 16 which are likely to be constantly deformed while the device is in operation. The rollways and the outer casing 1 need not be resilient to the same extent as the movable rod and the two cages, since the device is liable to be installed permanently in a given location and not subjected to any deformation during operation.

According to a basic feature of the invention, the cage or spacer 15 is formed with openings 18, which are of a size substantially greater than the diameter of the ball 3, in order to provide all around the ball between the latter and the spacer a clearance sufficient for preventing the ball to get squeezed or jammed by the spacer regardless of the deformations of the latter. The ball might have a tendency to escape out of the openings of the spacer, in particular when the spacer is subjected to heavy strains under some operating requirements with short radius of curvature at given locations in the path of the spacer within the tubular sheath. In order to avoid such a possible escape of the ball, the opening 18 is bounded in the longitudinal direction by walls 19 oriented substantially at right angles to the axis of the tubular casing and having a sufficient height to prevent the balls 3 from passing either between the spacer 15 and the flat core 2 or between the spacer and the rollway 5. To this aim, the height of the partition 19 is preferably substantially equal to the radius of the ball. It has been experienced that such a height is sufficient for safely retaining the ball, without however running the risk of creating detrimental friction effects between the spacer and core 2 or the rollway 5.

According to another feature of the invention, the wall 19 that retains the ball is constituted by a turned-up edge of a dished portion 22 on each side of the opening 18 in the longitudinal direction. This dished portion 22 contributes according to its length and its shape in giving the spacer an additional strength if need be.

Finally, still to reduce friction to a strict minimum, the ball retaining wall 19 is formed into a rounded shape. In this manner, when the ball comes into engagement with the spacer, the area of contact takes place substantially in the middle plane of the device, level with the center of the ball, which is the most favourable condition for frictional forces to be reduced to a minimum for avoiding the building of oblique components liable to create greater passive resistances.

As the transmitting device is being operated by pushing or pulling the rod 7, the core 2 is set in motion in rolling engagement with the balls which, in their turn, roll upon the two rollways. In the course of this rolling movement, the spacers, which are driven along at half the speed of the central operating strip, serve to maintain constant spacing of the balls, a condition which is necessary to the strength and the smoothness in operation of the device, irrespective of the curves of the device is to follow. Owing to the flexibility and the resiliency of the various members, it is possible to make the receiving end of the device occupy any direction regardless of the orientation of the input or control end, by flexing the device in a direction perpendicular to the plane of the core 2, of the rollways 5 and 6, and of the cages 15 and 16, combined if need be with torsional deformations of the whole assembly.

The inventor has already designed spacers for maintaining balls to a suitable relative spacing; such spacers were made of a thin strip and the housings for the balls were formed merely by openings cut at intervals through the spacers, as shown in Fig. 7 as an illustration. For preventing the balls from falling out of the spacers when the latter were separated from the remainder of the device, the openings had a diameter smaller than that of the balls in both directions of exit of the ball and the spacers were in permanent frictional engagement with the ball, thus introducing passive resistances due to a jamming effect, the balls being retained laterally in the vicinity of an equator plane thereof, prejudicious to a smooth and regular operation of the device. This inconvenience already existing in rectilinear portions of the transmission, greatly increased in the bends. Actually, the decrease in the size of a ball housing in such deformed portions, gave rise to compression stresses upon the ball which could reach such high values as to cause some balls to get jammed in the spacer and unable to roll anymore along the rollways. It is understood that the reason for such an inadequate operation consisted mainly in an insufficient clearance between the balls and the walls of their respective housings in the spacer. The additional frictional forces thus created urged the balls to snap out of their housings in the embedded ball system.

This is why, in this invention, while providing through the cages openings of a diameter materially greater than the diameter of the balls, the walls of these openings have been designed so as to have in a direction perpendicular to the transmission a height sufficient for preventing the balls in any case from snapping out of their housings.

Furthermore, it should be noted that when the balls are jammed in their cage, the frictional work is equal to the product of the frictional forces by the length of travel of the operating rod 7, whereas when the balls are allowed to rotate freely in the spacer, the work of the frictional forces corresponds to a length of travel ½ L amounting only to half the stroke L of the rod 7 since, as already pointed out hereinabove, the spacers are moved a distance equal to only half the length of travel of the operating rod and that, according to the invention, these spacers rest on the sections instead of on the balls. It should also be noted that, apart from this matter of reduction in the displacement of the point of application of the frictional forces afforded by the design of the spacers according to the invention, such frictional forces are themselves considerably reduced, actually they are restricted to the frictional effect exerted by the spacer upon the flat sections during rolling movement, since the cages according to the design of the transmitting device, have no part to play in the power transmission along the device. The resistance they oppose to the balls being driven along is every weak, whereas in known devices of the prior art, when the balls were jammed by the cages, an important force develops between the balls and the rollways on one hand, and between these balls and the middle operating rod on the other hand. In these conditions, it is readily understood that the frictional work might possibly reach quite prohibitive values.

The provision of a substantial clearance between the balls and the cages makes the operation of the device very smooth, because the frictional forces are always more difficult to overcome at the moment of starting a mechanism than when continuing its motion, since it is well known that the friction factor is higher at rest than during motion. The provision of clearance between the balls and the cage thus enables the cage to start without driving along all the balls at the same time, as it would be the case were the balls fitted in the cage practically without any play.

Of course, the invention is in no way restricted to the embodiment described and illustrated and many modifications thereof may be designed by those skilled in the art depending on the applications contemplated without departing from the scope of this invention as defined in the accompanying claims.

Thus, the walls of the openings through the cage which holds the balls have been described and shown as turned-up edges of dished portions of the cage adjacent these openings, on each side of the ball in the longitudinal direction of the cage, but the scope of the invention would not be departed from, were these walls designed in any other way and namely for instance, in the form of separate partitions secured to the cage by welding or any other suitable means, provided these partitions constitute walls which meet the requirements herein above stated.

What is claimed is:

1. In a flexible remote control cable having a tubular sheath, the combination with a flexible flat metallic core guided in said sheath along substantially its whole length by means of two rows of rolling elements interposed between either side of said core and said sheath, of two flat metal strips freely slidable in said sheath each on one side of said core, said strips being each provided with spaced openings each adapted to receive one of said rolling elements to keep said elements in spaced relationship, each opening being slightly larger than the rolling element therein and being provided on either side of the rolling element engaged therein with transverse walls making an angle with said core and having a height at least equal to the rolling radius of said element, so that the latter is free to rotate within said opening without any risk of jamming or escaping, however flexed said sheath may be.

2. A flexible remote control according to claim 1, wherein said transverse walls of said openings are each formed by an edge of said opening turned up in a plane substantially right-angled to the longitudinal axis of the strip in which said opening is provided.

3. A flexible remote control cable according to claim 1, wherein each one of said strips is formed with a dished portion extending longitudinally adjacent to each one of said openings on either side thereof, the edge of said dished portion being turned-up in a plane substantially right-angled to the longitudinal axis of said strip to form one of said transverse walls of said opening.

4. A flexible remote control cable according to claim 1, wherein said rolling elements consist of balls and wherein the transverse walls of said openings have such a shape as to be adapted to come into engagement with said balls only substantially in their equator plane.

5. A flexible remote control cable according to claim 1, wherein said rolling elements consist of balls and wherein the transverse walls of said openings are in the shape of a portion of a cylindrical surface the radius of which is greater than the radius of said balls.

References Cited in the file of this patent

FOREIGN PATENTS

| | | |
|---|---|---|
| 264,397 | Switzerland | Jan. 3, 1950 |
| 826,679 | Germany | Jan. 3, 1952 |